Patented July 7, 1942

2,289,303

UNITED STATES PATENT OFFICE 2,289,303

METHINE DYESTUFFS

Walter Dieterle, Dessau-Ziebigk, and Fritz Bauer, Dessau, Germany, assignors, by mesne assignments, to General Aniline & Film Corporation, New York, N. Y., a corporation of Delaware No Drawing. Application December 29, 1938, Serial No. 248,230. In Germany December 30, 1937

8 Claims. (Cl. 260—240)

Our present invention relates to the manufacture of intermediate products for producing known symmetrical and unsymmetrical methinecyanines.

A known process for producing intermediate products for further condensation to symmetrical or unsymmetrical methinecyanines consists in causing a diarylformamidine to react with a quaternary nitrogenous heterocyclic base, the condensation product being further used as such or after conversion into the so-called ω-aldehyde by scission by means of alkaline agents. In a number of cases, these known intermediate products are not obtained in a sufficient degree of purity, there being formed frequently a large proportion of symmetrical methine dyestuffs which must be considered as undesired secondary products. These are only removed with difficulty so that the further working up into the desired methinecyanine does not proceed smoothly.

It is an object of our invention to provide a process by which intermediate products for making methinecyanine dyestuffs are obtained in a purer state than hitherto.

Another object of this invention is the provision of a process of producing such intermediate products by condensing an azomethine comprising a heterocyclic nitrogenous base hydrogenated in the heteroring or a salt thereof the nitrogen atom of said base or salt having linked thereto the molecular grouping Aryl—N=CH— an azomethine of the formula

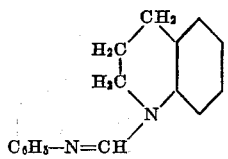

with a quaternary salt of a nitrogenous heterocyclic base, preferably in the presence of a condensing agent, especially acetic anhydride. The methine compounds thus produced are for the most part colored and partake of the character of dyestuffs.

Further objects of our invention will appear from the description following hereinafter.

The azo-methine serving for the condensation is characterized by the following general formula:

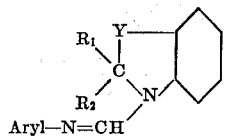

wherein $Y = -CH_2-CH_2-$, $=CH_2$,

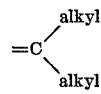

S, $-O-CH_2-$, $-S-CH_2-$ $R_1 = H$
$R_2 = H$ or alkyl.

These compounds, which have not hitherto been described, may be made by condensing a formylaminoaryl, for example formanilide, with the heterocyclic base in question hydrogenized in the hetero-ring, for example tetrahydroquinoline.

The manufacture of one of the new compounds is described in the following example:

Formanilide and tetrahydroquinoline are caused to react in the presence of phosphorus trichloride whereby the following compound is produced

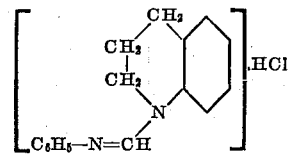

By treatment with caustic soda lye the azomethine is liberated from this body and is then extracted from the mixture by means of ether and separated from secondary products and parent materials by fractional distillation. The boiling point at 11 mms. pressure is 226–228° C. This nearly colorless oil solidifies after standing for some time. It is then recrystallized from a small quantity of methanol. It is a snow white crystalline powder of feeble odor melting at 68° C. In quite similar manner such compounds may be made from dihydro-α-methylindol, α-methylphenmorpholine, α-methylthiophenmorpholine and similar cyclic amines.

These new products may also be isolated in the form of sparingly soluble salts. The production of such a salt is illustrated by the following example:

1 mol of the azo-methine from aniline and tetrahydroquinoline, the constitution of which has been indicated above, is dissolved in a liter of warm methanol. For the dissolution there is added rather more than 1 mol of hydrogen chloride in the form of aqueous hydrochloric acid. Finally there is added somewhat more than 1 mol of potassium iodide in the form of an aqueous solution of 10 per cent strength and the whole is cooled. After standing for some time the greater part of the desired base has crystallized in the form of hydriodide. This snow white crystalline powder is sparingly soluble in water and is somewhat more freely soluble in methanol. In contact with water hydrolysis occurs, as is to be detected by the development of an acid reaction.

The formation of the intermediate product from the azo-methine base may be represented by the following scheme:

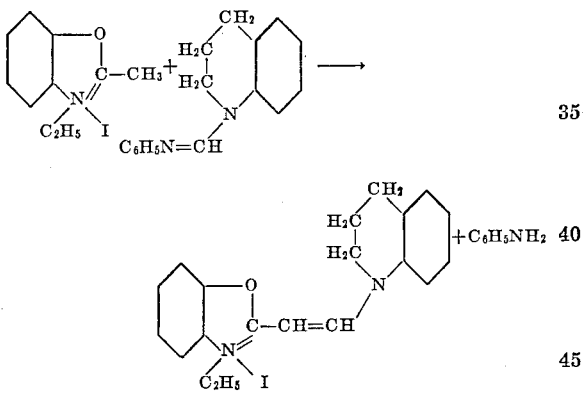

The condensation occurs easily in a solution free from water, preferably in acetic anhydride. All quaternary salts of 2-methyloxazoles, 2-methylthiazolines and 2-methylselenazolines are suitable for the condensation.

These finished intermediate products may be either condensed directly with the same or a different heterocyclic compound of the kind usual in cyanine dye formation to form symmetrical or unsymmetrical cyanines, for instance in the presence of pyridine

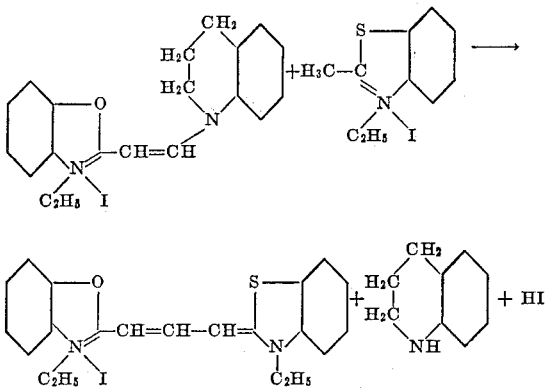

or split into the corresponding ω-aldehydes by means of weak or strong alkaline agents:

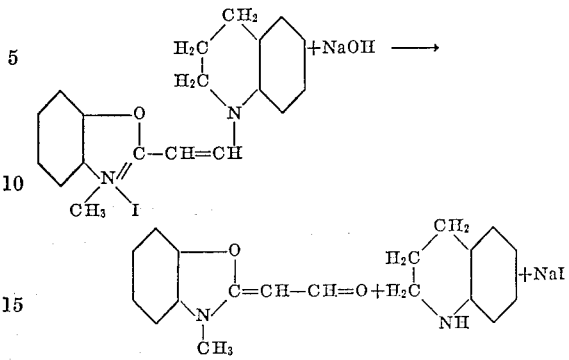

and these ω-aldehydes then condensed to form cyanine dyestuffs.

The following examples illustrate the invention:

*Example 1.*—10 grams of 2.5.6-trimethylbenzoxazole-ethiodide and 7.5 grams of the following azo-methine

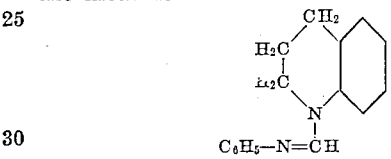

are well mixed. 35 cc. of acetic anhydride are added and the mixture is heated until reaction begins. This is followed by twice boiling the mixture for a short time while stirring, after cooling the mixture and adding 35 cc. of ether thereto. The whole is allowed to stand for a short time, whereby the compound crystallizes. It is filtered with suction and washed with a mixture of alcohol and ether and then with ether. The yield is 12 grams amounting to 86 per cent of the theoretical yield. The product is a yellow crystalline powder.

*Example 2.*—10 grams of 2.5.6-trimethylbenzoxazole-ethiodide and 7.5 grams of the azo-methine

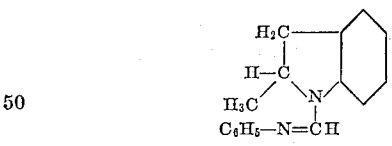

are mixed together with 35 cc. of acetic anhydride and the mixture is heated until the reaction begins. The mass solidifies during the heating to a crystalline magma. After cooling, 35 cc. of ether are added and the solid matter is filtered with suction and washed with a mixture of alcohol and ether and then with ether. The yield is 11.5 grams amounting to 80 per cent of the theoretical yield. The product is a yellow crystalline powder.

*Example 3.*—10 grams of 2-methylthiazoline-ethiodide and 9.1 grams of the following azo-methine

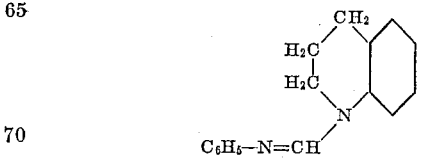

are mixed with 38 cc. of acetic anhydride and the mixture is heated until the reaction begins. The liquid is boiled a short time and after cooling thereof, 100 cc. of ether are added. The crystalline mass is filtered with suction, washed with much ether and dried on a clay plate. The yield is 11 grams amounting to 71 per cent of the theoretical yield. The product is a yellow crystalline powder. It may be assumed to have the following formula:

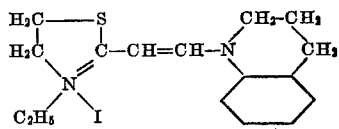

*Example 4.*—5 grams of 2-methylselenazoline-ethiodide are heated together with 5 grams of phenoltetrahydroquinolylformamidine and 20 cc. of acetic anhydride until reaction begins. The reaction continues for some minutes. After cooling the crystals which have separated are filtered with suction and washed once with 5 cc. of acetic anhydride, then with ether. The yield is 4 grams of yellow brown crystals.

3.5 grams of this intermediate product are suspended in 25 cc. of methanol and there are added 7 cc. of caustic soda lye of 10 per cent strength. The methanol and tetrahydroquinoline are then expelled by steam and the residue in the still is drained from a small quantity of black products of decomposition and shaken three times with chloroform. The chloroform extract is thoroughly dried with anhydrous sodium sulfate and the chloroform expelled by steam under a vacuum. There remains a bright yellow oil which after long standing and low cooling solidifies. The yield is 0.3 gram.

We claim:

1. A process of producing a methine compound which comprises condensing a quaternary salt of a member selected from the group consisting of 2-methyl-oxazole, 2-methyl-thiazoline, and 2-methyl-selenazoline with a member selected from the group consisting of a nitrogenous heterocyclic base of the type

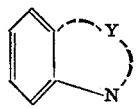

wherein Y represents the atoms necessary to complete a saturated ring, said base containing linked to the nitrogen atom the molecular grouping A—N=CH— wherein A is aryl, and a salt thereof in the presence of acetic anhydride.

2. A process of producing a methine compound which comprises condensing 2.5.6-trimethyl-benzoxazole ethiodide with a compound of the following formula

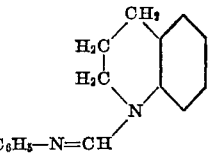

in the presence of acetic anhydride.

3. A process of producing a methine compound which comprises condensing 2-methylthiazoline ethiodide with a compound of the following formula

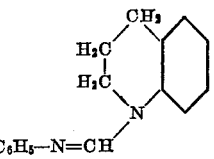

in the presence of acetic anhydride.

4. A process of producing a methine compound which comprises condensing 2-methylselenazoline ethiodide with a compound of the following formula

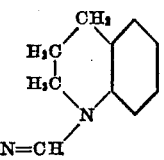

in the presence of acetic anhydride.

5. A methine compound corresponding with the following formula

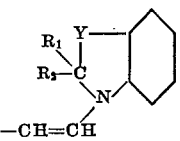

wherein
Y is a member selected from the group consisting of —CH$_2$—CH$_2$—, CH$_2$,

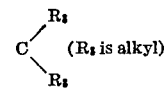

S, —O—CH$_2$—, and —S—CH$_2$—, the sulfur and oxygen atoms in the last two radicals being attached to the benzene ring,
R is the radicle of a quaternary salt of a compound selected from the group consisting of oxazole, thiazoline, and selenazoline,
R$_1$ is hydrogen,
R$_2$ is a member selected from the group consisting of hydrogen and alkyl.

6. A compound corresponding with the following formula

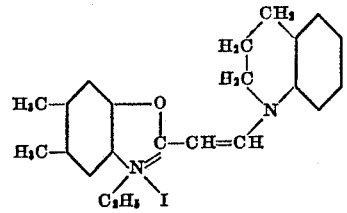

7. A compound corresponding with the following formula

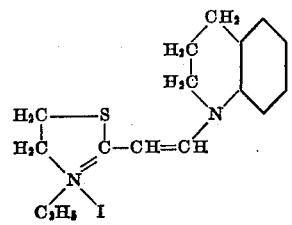

8. A compound corresponding with the following formula

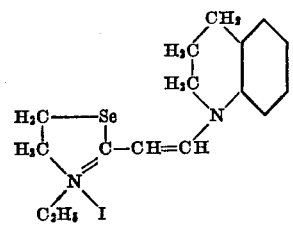

WALTER DIETERLE.
FRITZ BAUER.